United States Patent
Marino et al.

(10) Patent No.: US 9,475,117 B2
(45) Date of Patent: Oct. 25, 2016

(54) CENTRIFUGAL CASTING APPARATUS AND METHOD

(71) Applicant: EMBRACO EUROPE S.r.l., Turin (IT)

(72) Inventors: Michele Marino, Turin (IT); Mauro Feroleto, Asti (IT)

(73) Assignee: EMBRACO EUROPE S.r.l., Turin (IT)

( * ) Notice: Subject to any disclaimer, the term of this patent is extended or adjusted under 35 U.S.C. 154(b) by 126 days.

(21) Appl. No.: 14/357,465

(22) PCT Filed: Nov. 7, 2012

(86) PCT No.: PCT/IB2012/056207
§ 371 (c)(1),
(2) Date: May 9, 2014

(87) PCT Pub. No.: WO2013/068930
PCT Pub. Date: May 16, 2013

(65) Prior Publication Data
US 2014/0306570 A1 Oct. 16, 2014

(30) Foreign Application Priority Data
Nov. 9, 2011 (IT) .............................. TO2011A1032

(51) Int. Cl.
| | |
|---|---|
| *B22D 13/04* | (2006.01) |
| *B22D 13/10* | (2006.01) |
| *B22D 19/00* | (2006.01) |
| *B22D 17/00* | (2006.01) |
| *H02K 17/16* | (2006.01) |

(52) U.S. Cl.
CPC ........... *B22D 19/0054* (2013.01); *B22D 13/04* (2013.01); *B22D 13/101* (2013.01); *B22D 17/00* (2013.01); *B22D 17/002* (2013.01); *H02K 17/165* (2013.01)

(58) Field of Classification Search
CPC ..... B22D 13/04; B22D 13/10; B22D 13/101
USPC .................................................. 164/286, 296
See application file for complete search history.

(56) References Cited

U.S. PATENT DOCUMENTS

2005/0184430 A1    8/2005  Feick

FOREIGN PATENT DOCUMENTS

| | | |
|---|---|---|
| CN | 101954467 A | 1/2011 |
| WO | 03/049886 A2 | 6/2003 |
| WO | 03/097274 A2 | 11/2003 |

OTHER PUBLICATIONS

International Search Report of PCT/IB2012/056207 dated Jan. 30, 2013.
English Translation of Chinese Office Action dated Sep. 6, 2015 in counterpart application No. 2012800550091.

*Primary Examiner* — Kevin P Kerns
(74) *Attorney, Agent, or Firm* — Sughrue Mion, PLLC

(57) ABSTRACT

A centrifugal casting apparatus including: a lower half-mold (10) mounted on a support (12) provided with driver for rotation about a substantially vertical central axis (14), the lower half-mold (10) being a solid of revolution having a first central cavity (36); an upper half-mold (16) facing the lower half-mold (10), the upper half-mold (16) being a solid of revolution having a second central cavity (56); and a device for causing the axial movement of the half-molds (10, 16) towards and away from each other. The lower half-mold (10) and the upper half-mold (16) each have at least one passage (46, 66) which puts the respective central cavity (36, 56) into communication with the outside through an outlet aperture through which the central axis (14) does not pass.

7 Claims, 7 Drawing Sheets

CENTRIFUGAL CASTING APPARATUS AND METHOD

CROSS REFERENCE TO RELATED APPLICATIONS

This is a National Stage of International Application No. PCT/IB2012/056207 filed Nov. 7, 2012, claiming priority based on Italian Patent Application No. TO2011A001032 filed Nov. 9, 2011, the contents of all of which are incorporated herein by reference in their entirety.

BACKGROUND OF THE INVENTION

1. Field of the Invention

The present invention relates to the production by centrifugal casting, also known as spin casting, of a short-circuit cage of a rotor of an electric motor, particularly for a rotary electric motor for hermetic compressors of refrigerators and the like.

2. Background

As is known, a cage of this type is made of electrically conductive material, particularly aluminium, and is formed by an upper annular part and a lower annular part, which are connected by a plurality of circumferentially spaced bars. Typically, a cage of this type is made by casting molten aluminium in a rotating mould in which a pack of magnetic laminations has been positioned in advance. The aluminium fills gaps between the walls of the mould and the pack of laminations, and also fills passages created within the pack, thereby forming the aforesaid annular parts and bars respectively. Thus the bars remain embedded in the pack, to which the rotor shaft is subsequently fastened.

A known apparatus of this kind is described in WO-03/097 274.

Cages produced with this apparatus may have non-uniformity and irregularity in their shape, leading to undesirable variations in starting torque, poorer performance and increased vibration during operation.

This non-uniformity is due to the gases which, when captured during casting, cannot be vented towards the outside and therefore remain trapped in the casting.

The object of the present invention is therefore to overcome the drawbacks of the method used at present, thus making it possible to obtain uniform castings of regular shape.

SUMMARY OF THE INVENTION

According to the invention, this object is achieved by means of a centrifugal casting apparatus comprising: a lower half-mould (10) mounted on a support (12) provided with driving means for rotation about a substantially vertical central axis (14), said lower half-mould (10) being a solid of revolution having a first central cavity (36); an upper half-mould (16) facing the lower half-mould (10), said upper half-mould (16) being a solid of revolution having a second central cavity (56); and means for causing the axial movement of said half-moulds (10, 16) towards and/or away from each other, wherein said lower half-mould (10) has at least one passage (46) which puts said first central cavity (36) into communication with the out-side through an outlet opening through which said central axis (14) does not pass, and in that said upper half-mould (16) has at least one passage (66) which puts said second central cavity (56) into communication with the outside through an outlet opening through which said central axis (14) does not pass.

Preferred characteristics of the apparatus according to the invention are further described and claimed below. For example, the two half-moulds have channels with a shape and inclination such that the gases are extracted from the casting melt and are expelled when the moulds are made to rotate.

The pieces produced by the apparatus according to the present invention, particularly short-circuit cages, are substantially free of blowholes, and therefore have an excellent degree of filling and compactness as well as virtually constant dimensions and weight, while the variations between cages are virtually insignificant.

Accordingly, further objects of the present invention are a method of producing short-circuit cages and the cages produced in this way, as described below.

The constancy of the dimensional parameters of the cages causes the formation of a more regular gap between the rotor and stator, thus improving the starting performance of the electric motor concerned. Furthermore, the profile of the short-circuit rings is such that the size of the gap can be accurately checked, thus preventing any ends of wires protruding out of the stator windings from becoming hooked during the checking operation and being brought into contact with the rotor, thus earthing it.

BRIEF DESCRIPTION OF THE DRAWINGS

Other advantages and features of the present invention will become clear from the following detailed description, which is given by way of non-limiting example with reference to the attached drawings, in which.

DETAILED DESCRIPTION OF THE PREFERRED EMBODIMENTS OF THE INVENTION

Figure 1:
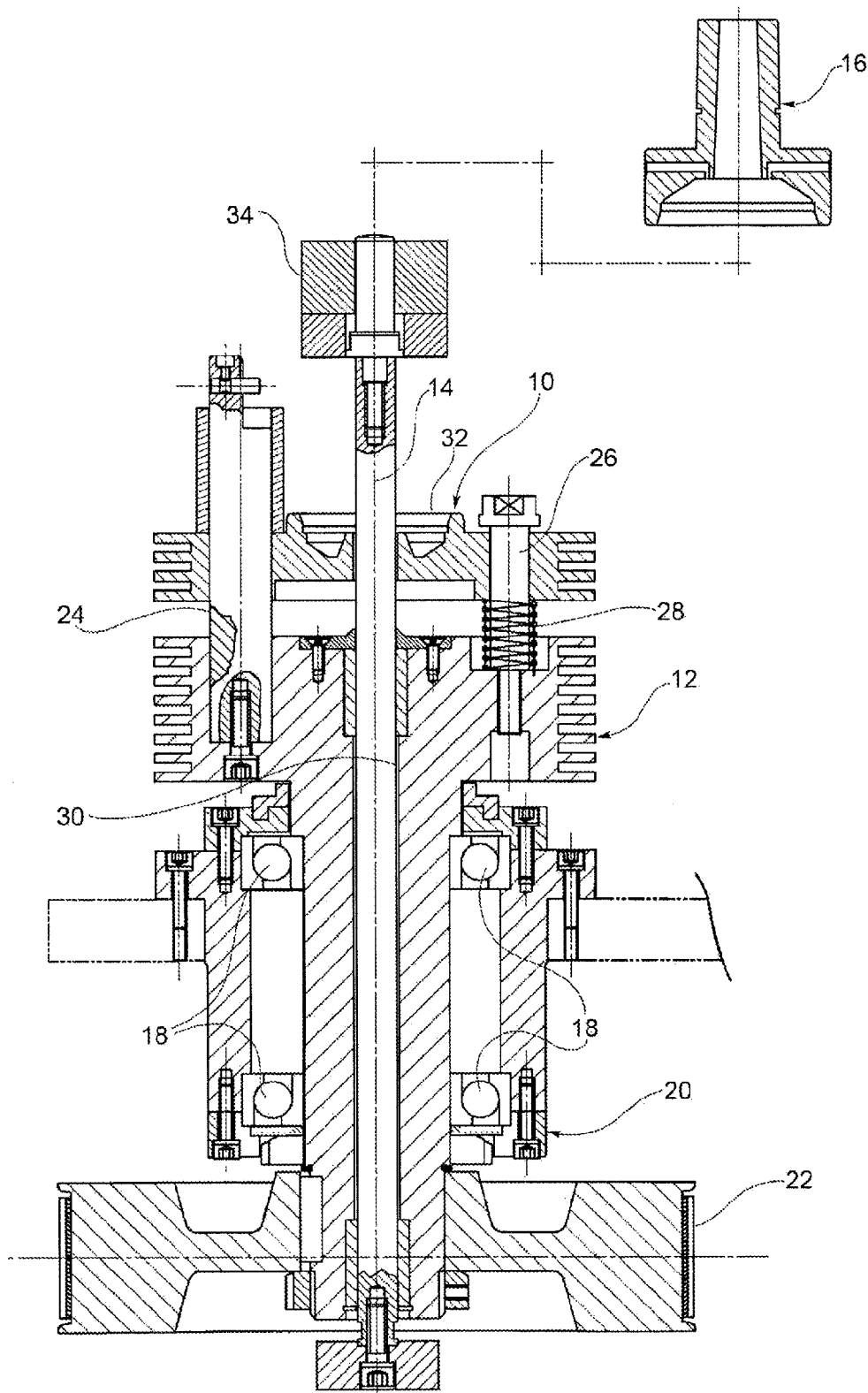
FIG. 1 is a schematic view, in elevation and in cross section, of an apparatus according to the invention.

An apparatus for carrying out centrifugal casting procedures comprises (FIG. 1) a lower half-mould 10 mounted on a support 12 which is provided with drive means for rotation about a substantially vertical central axis 14, an upper half-mould 16 facing the lower half-mould 10, and means for causing the axial movement of the half-moulds 10, 16 between an open mould configuration and a closed mould configuration.

The aforesaid general structure of the apparatus corresponds to that described in WO03/097 274, which may be consulted for information on particular elements which are not described in detail in the present document because they are not relevant for the purposes of the present invention.

In principle, the support 12 of the lower half-mould 10 is mounted rotatably by means of bearings 18 on a fixed frame 20 and the rotational drive means include a pulley 22 integral with the lower end of the support 12. The support 12 also has columns 24 spaced at equal circumferential intervals which act as guides for the axial movement of the lower half-mould 10. Rods 26 spaced at equal circumferential intervals also protrude from the support 12 and alternate with the columns 24, coil springs 28 being mounted about these rods and urging the lower half-mould 10 away from the support.

The apparatus further comprises a central bar 30 positioned along the central axis 14 and passing through central cavities of the support 12 and of the half-moulds 10, 16. The bar 30 is provided with a flange 32 to support a pack 34 of rotor laminations of an electric motor, and is provided with drive means (not shown) which cause it to be translated along the axis 14.

The upper ends of the columns 24 are also associated with means for fastening the upper half-mould 16, which can thus be associated with the remaining parts of the apparatus.

Figure 2:
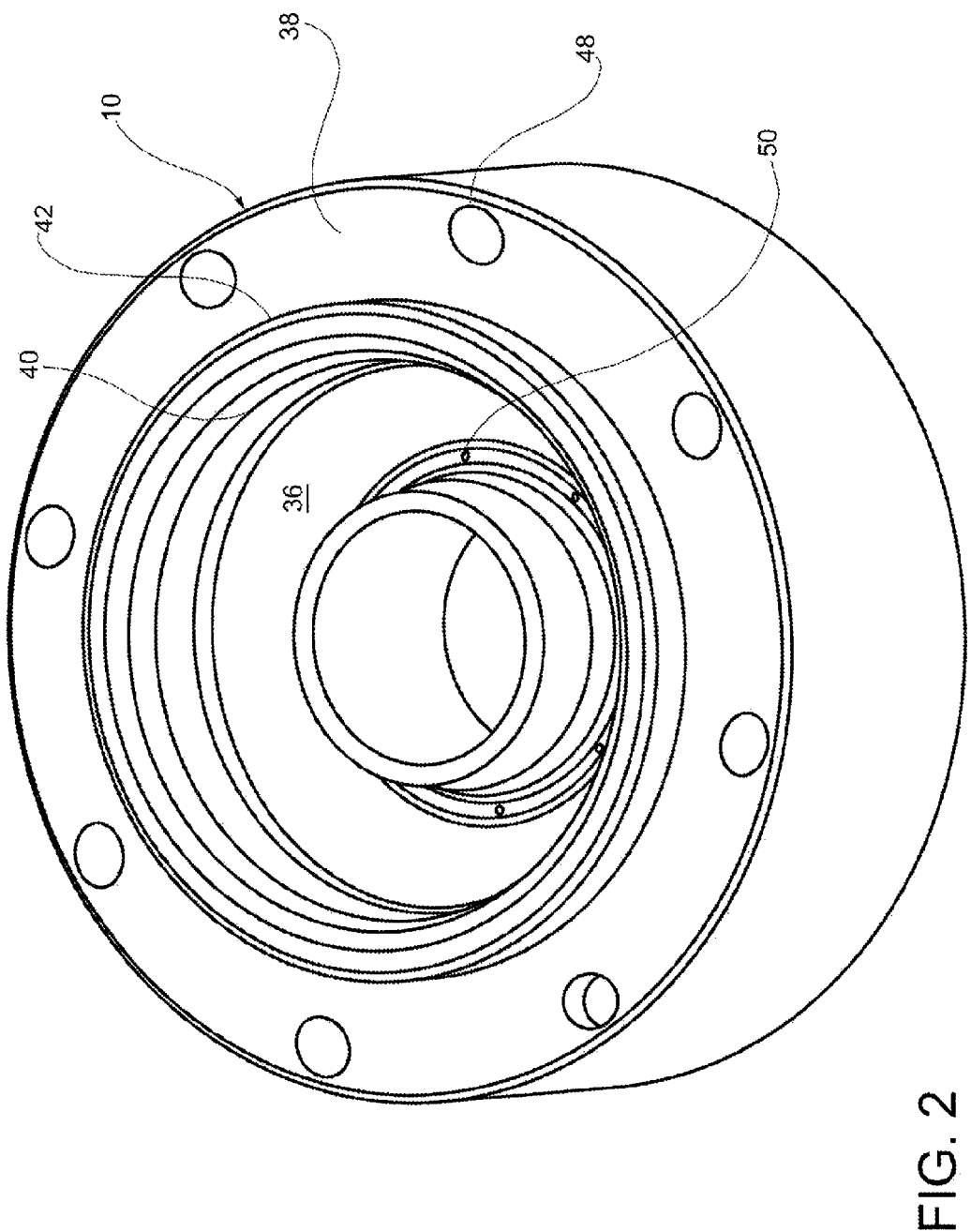
FIG. 2 is a perspective view from above of a lower half-mould forming part of the apparatus of FIG. 1.
Figure 3:
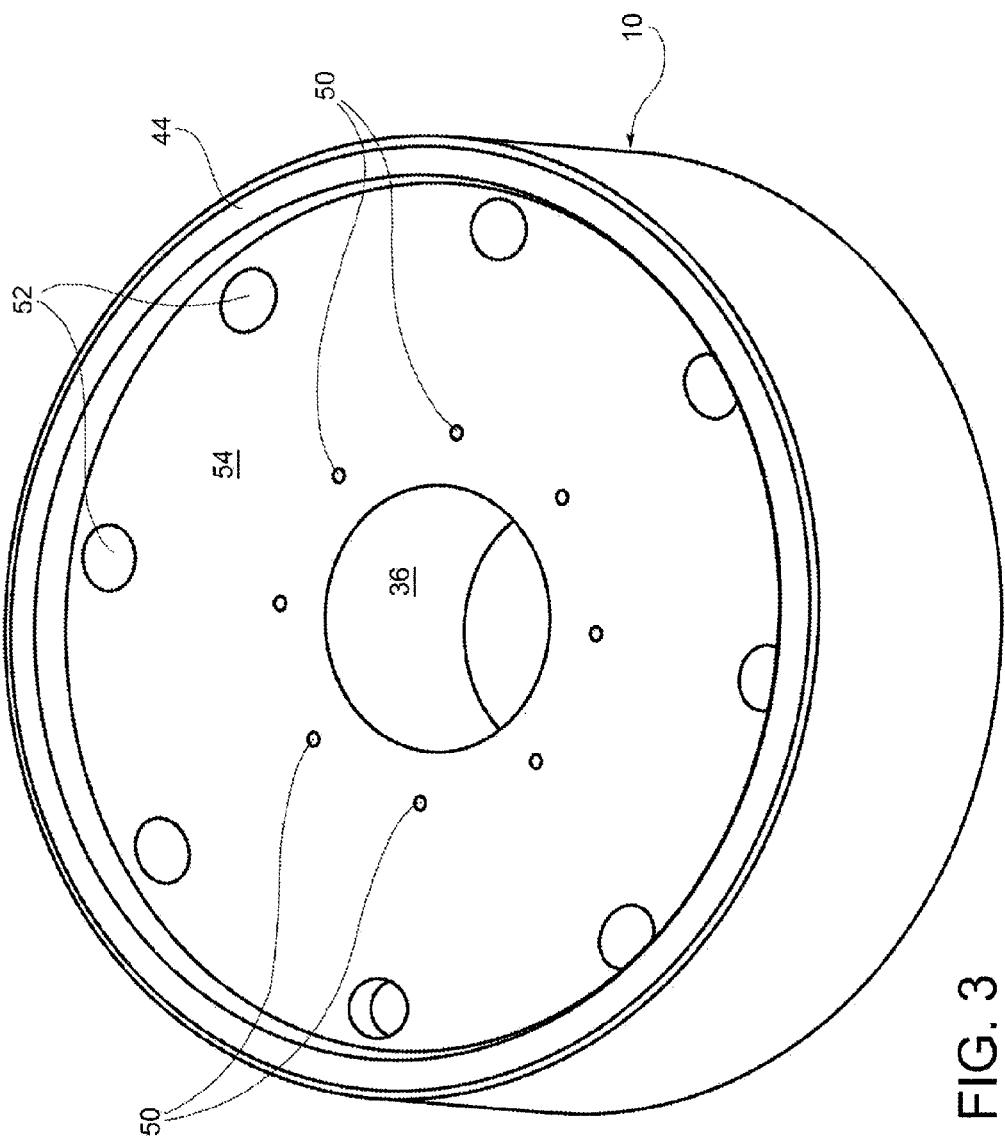
FIG. 3 is a perspective view from below of the lower half-mould of FIG. 2.
Figure 4:
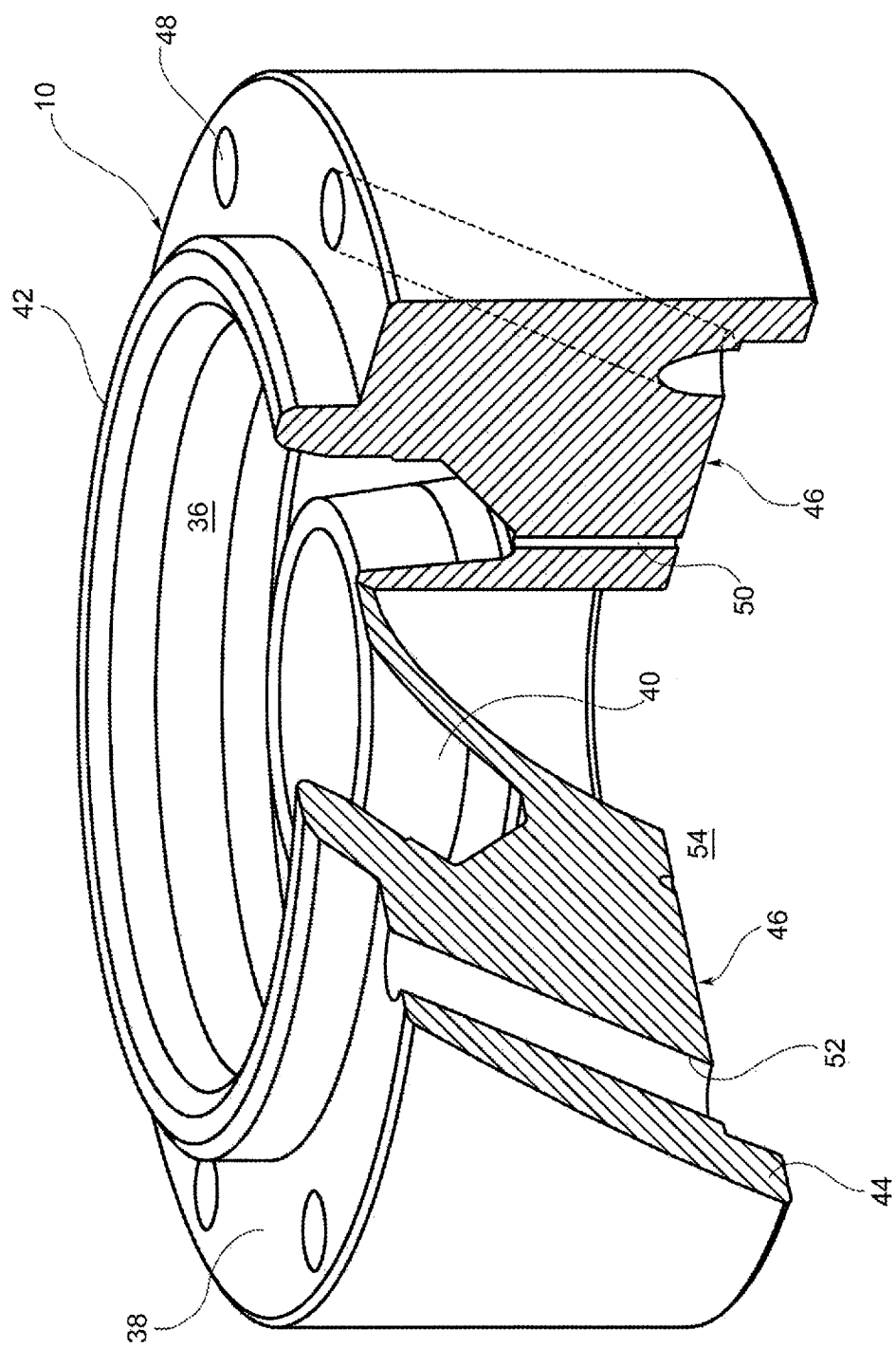
FIG. 4 is an exploded perspective view of the lower half-mould of FIGS. 2 and 3.

The lower half-mould 10 (FIGS. 2-4) is a solid of revolution having a first central cavity 36 extending along the central axis 14 over the whole height of the half-mould 10. It has a cross section, in a plane passing through the axis 14, substantially in the shape of a quadrilateral, and has, on its upper face 38, a circumferential groove 40 and a first circumferential projection 42 lying radially outside the groove 40. It also has a second circumferential projection 44 on the radially outer edge of its lower face.

The lower half-mould 10 has a plurality of passages 46 spaced apart from each other circumferentially, which put the first central cavity 36 into communication with the outside through outlet apertures 48 through which the central axis 14 does not pass. Each passage 46 is formed by a first substantially vertical branch 50 which extends from the bottom of the groove 40, and a second inclined branch 52 which opens radially outside the first projection 42 on the upper face 38. The first and the second branch 50, 52 communicate with each other through a chamber 54 which extends on the lower face of the half-mould 10, radially inside the second circumferential projection 44.

The first branch 50 has a constant cross-section whose diameter is in the range from 0.5 to 2 mm.

Figure 5:
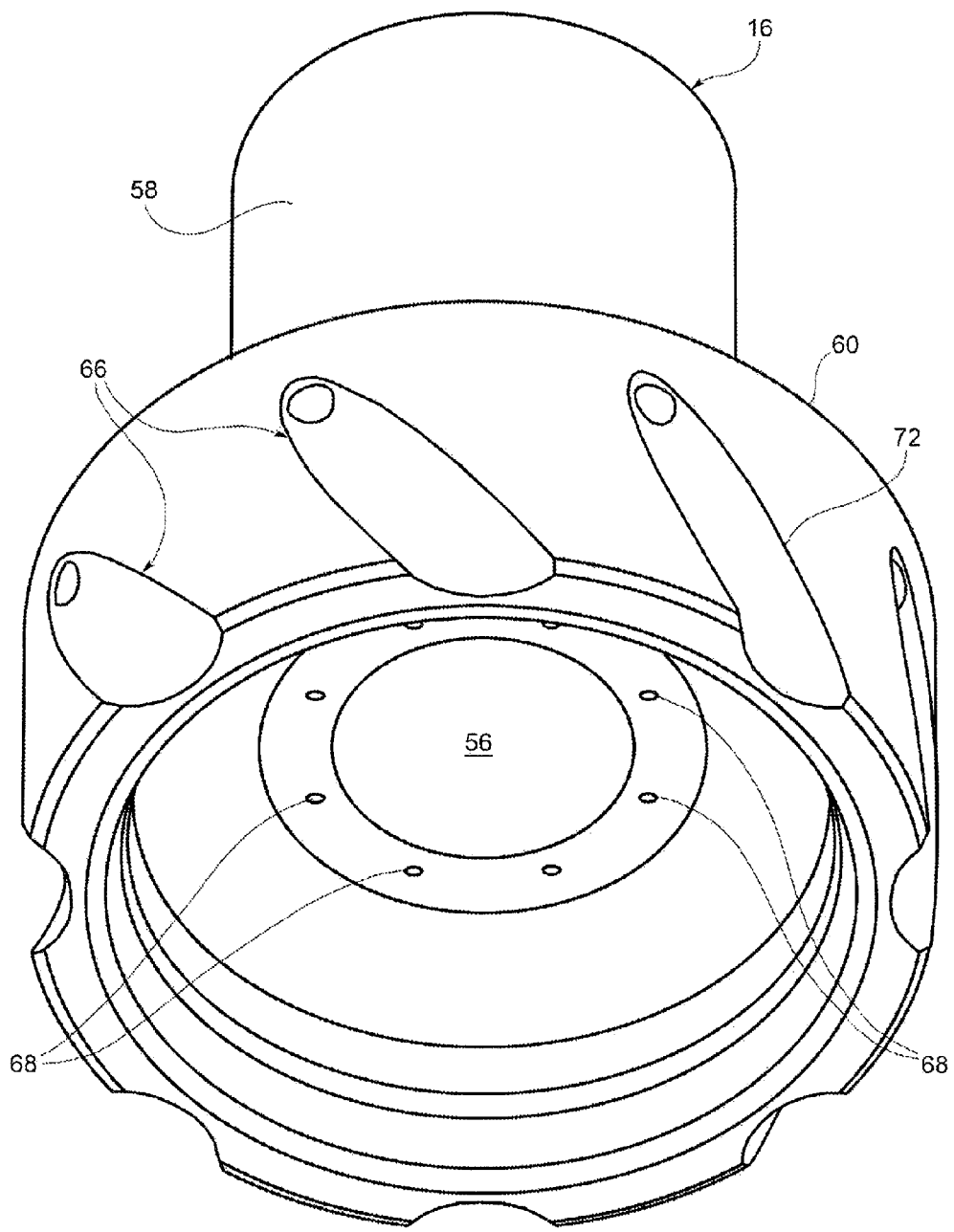
FIG. 5 is a perspective view from above of an upper half-mould forming part of the apparatus of FIG. 1.
Figure 6:
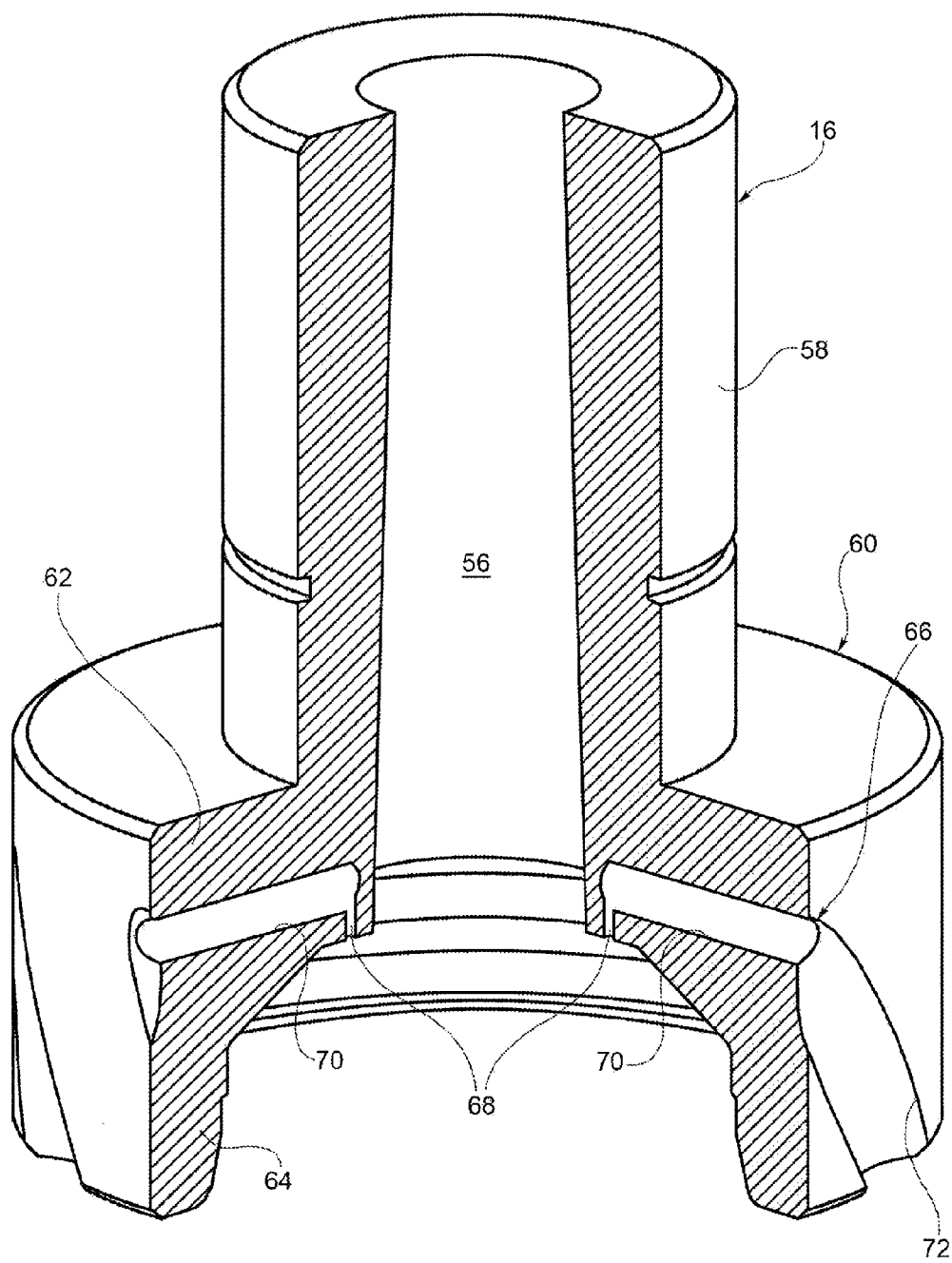
FIG. 6 is an exploded perspective view of the upper half-mould of FIG. 5.

The upper half-mould 16 (FIGS. 5-6) is also a solid of revolution, having a second central cavity 56 extending along the central axis 14 over the whole height of the half-mould 16. It comprises an upper tubular portion 58 and a lower portion 60 having, in a plane passing through the central axis, a cross-section in the shape of an inverted L formed by a substantially horizontal part 62 and by a radially outer substantially vertical part 64.

The upper half-mould 16 has a plurality of passages 66 spaced apart from each other circumferentially, which put the second central cavity 56 into communication with the outside through outlet apertures through which the central axis 14 does not pass. Each passage 66 is formed, in succession, by a first substantially vertical branch 68 which extends from the second cavity 56, a second radial branch 70, and a third branch 72 which is inclined relative to the vertical and which reaches the lower face of the lower portion of the half-mould 16. The first and the second branch 68, 70 are formed in the substantially horizontal part 62, while the third branch 72 is made in the form of a groove on the outer lateral surface of the substantially vertical part 64 and has an angle of inclination in the range from 25° to 50° relative to the vertical.

The apparatus described above can be used for producing a short-circuit cage for a rotor of an electric motor by centrifugal casting.

The centrifugal casting process includes (FIG. 1) a preparatory step in which the upper half-mould 16 is removed from the apparatus and a pack of laminations 34 is positioned around the upper end of the bar 30, bearing on the flange 32 which protrudes radially from this end. In a known way, circumferentially spaced channels (not visible in the drawings) are formed in the pack 34, these channels connecting the upper and lower surfaces of the pack and being typically inclined relative to the vertical.

In a similar way to what is described and illustrated in WO-03/097 274, which may be consulted for a general description of the operation, the bar 30 is then lowered in such a way that the flange 32 bears on the lower half-mould 10 and then pushes it downwards, thereby compressing the springs 28. Thus the upper half-mould 16 can be positioned above the pack 34 of laminations and fixed to the guide columns 24 (this is the open mould configuration). The bar 30 is then raised so as to bring the two half-moulds 10, 16 together, leaving gaps between their walls and the pack 34 (this is the closed mould configuration).

The actual moulding step is then carried out. In this step, molten metal, particularly aluminium, is cast from above into the second cavity 56, from which it flows along the channels formed through the pack 34 and the gaps between the latter and the walls of the half-moulds 10, 16, and then solidifies as a result of the rotation of the apparatus. During rotation, any gases formed in the molten metal are discharged to the outside through the passages 46, 66 formed in the two half-moulds 10, 16 respectively, which act as vents in such a way that the cast cage is free of any imperfections due to the incorporation of gas and has a weight and dimensions which are substantially constant and which meet desired standards. On the other hand, the molten metal cannot penetrate into the vent passages 46, 66, because of their dimensions and positioning.

Figure 7:
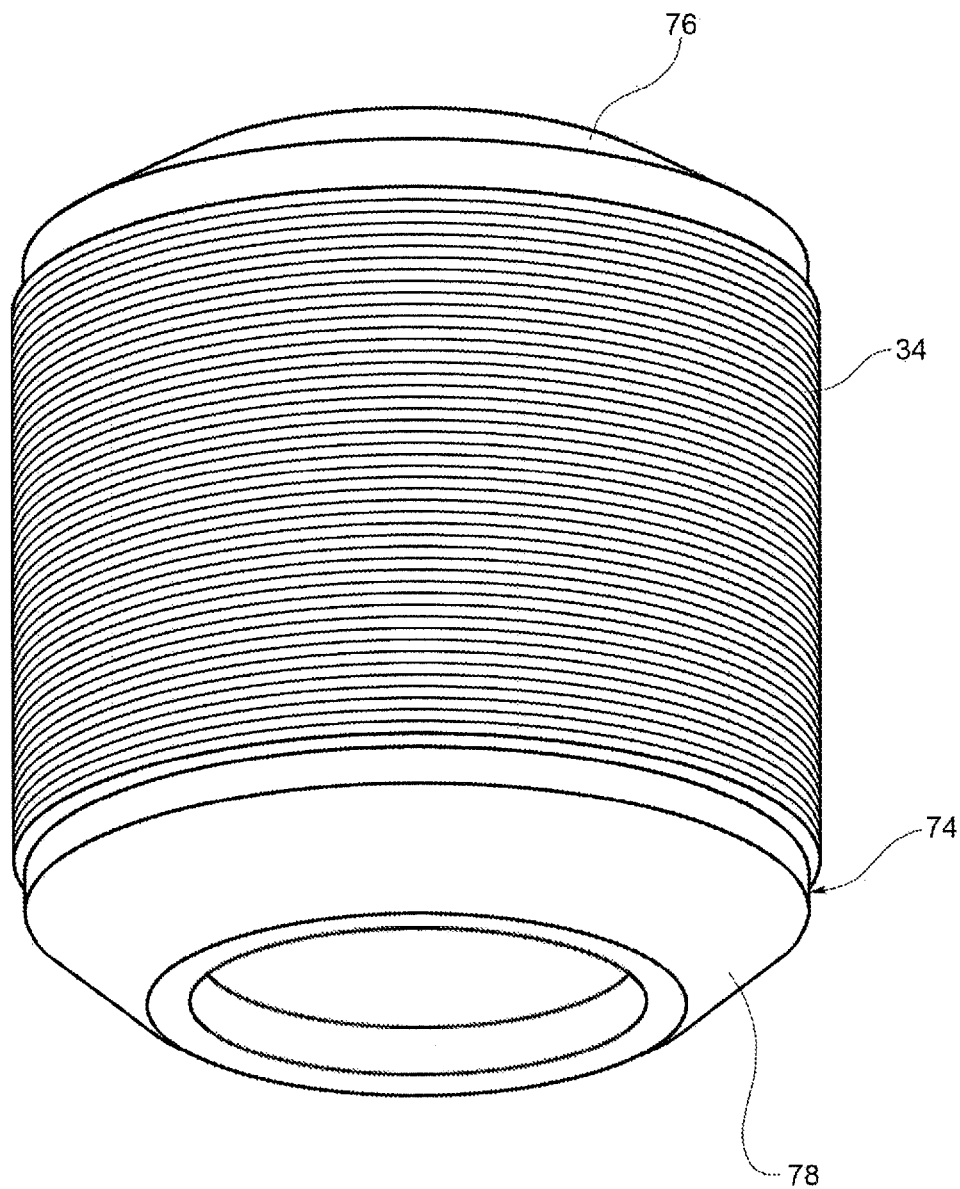
FIG. 7 is a perspective view of a short-circuit cage of a rotor of an electric motor moulded around a pack of laminations, using the apparatus of the preceding figures.

The moulded aluminium cage 74, which has been fixed to the pack 34 of laminations (see FIG. 7), can be removed from the apparatus by carrying out the opposite operations to those described above, in reverse order. In particular, the cage 74 is formed by an upper annular part 76 and a lower annular part 78 connected by a plurality of circumferentially spaced bars (not visible in FIG. 7). Because of the shaping of the half-moulds 10, 16, the upper and lower annular parts 76, 78 have a substantially frusto-conical shape with inclined outer surfaces.

Clearly, provided that the principle of the invention is retained, the details of construction and the embodiments can be varied widely from what has been described purely by way of example, without departure from the scope of the invention. In particular, the apparatus according to the invention can be used to produce cast pieces other than short-circuit cages.

The invention claimed is:

1. A centrifugal casting apparatus comprising:
    a lower half-mould (10) mounted on a support (12) provided with driving means for rotation about a vertical central axis (14), said lower half-mould (10) being a solid of revolution having a first central cavity (36),
    an upper half-mould (16) facing the lower half-mould (10), said upper half-mould (16) being a solid of revolution having a second central cavity (56), and
    means for causing the axial movement of said half-moulds (10, 16) towards and/or away from each other,
    wherein said lower half-mould (10) has at least one passage (46) which puts said first central cavity (36) into communication with an external environment through an outlet opening through which said central axis (14) does not pass, and in that said upper half-mould (16) has at least one passage (66) which puts said second central cavity (56) into communication with the external environment through an outlet opening through which said central axis (14) does not pass, and wherein said lower half-mould (10) has, in a plane passing through said central axis (14), a cross-section in the shape of a quadrilateral and has, on its upper face (38), a circumferential groove (40) and a first circumferential projection (42) which is radially outside said groove (40), and, on the radially outer edge of its lower face, a second circumferential projection (44), and said at least one passage (46) of the lower half-mould (10) is formed by a vertical first branch (50) extending from the bottom of the groove (40), and by a second inclined branch (52) opening radially outside said first projection (42), the first and the second branch (50, 52) communicating with each other through a chamber (54) extending on the lower face of the lower half-mould (10), radially inside the second circumferential projection (44).

2. The apparatus according to claim 1, wherein said lower half-mould (10) and/or said upper half-mould (16) have a plurality of said passages (46, 66) which are circumferentially spaced apart from each other.

3. The apparatus according to claim 1, wherein said passages (46, 66) have at least one portion extending in a radial direction.

4. The apparatus according to claim 1, wherein said first branch (50) has a cross-section whose diameter is in the range from 0.5 to 2 mm.

5. The apparatus according to claim 1, wherein said upper half-mould (16) comprises an upper tubular portion (58) and a lower portion (60) having, in a plane passing through said central axis (14), a cross-section in the shape of an inverted L formed by a horizontal part (62) and by a radially outer vertical part (64), and said at least one passage (66) of the upper half-mould (16) is formed, in succession, by a vertical first branch (68) extending from said second cavity (56), a second radial branch (70), and a third branch (72) inclined with respect to the vertical.

6. The apparatus according to claim 5, wherein said third branch (72) is inclined at an angle in the range from 25° to 50° relative to the vertical and/or is made in the form of a groove on the outer lateral surface of said vertical part (64).

7. The apparatus according to claim 5, wherein said first and said second branch (68, 70) are formed in said horizontal part (62).

* * * * *